July 28, 1931. E. J. RICHARD 1,816,056
CYLINDRICAL CUTTING SHEARS
Filed July 5, 1928
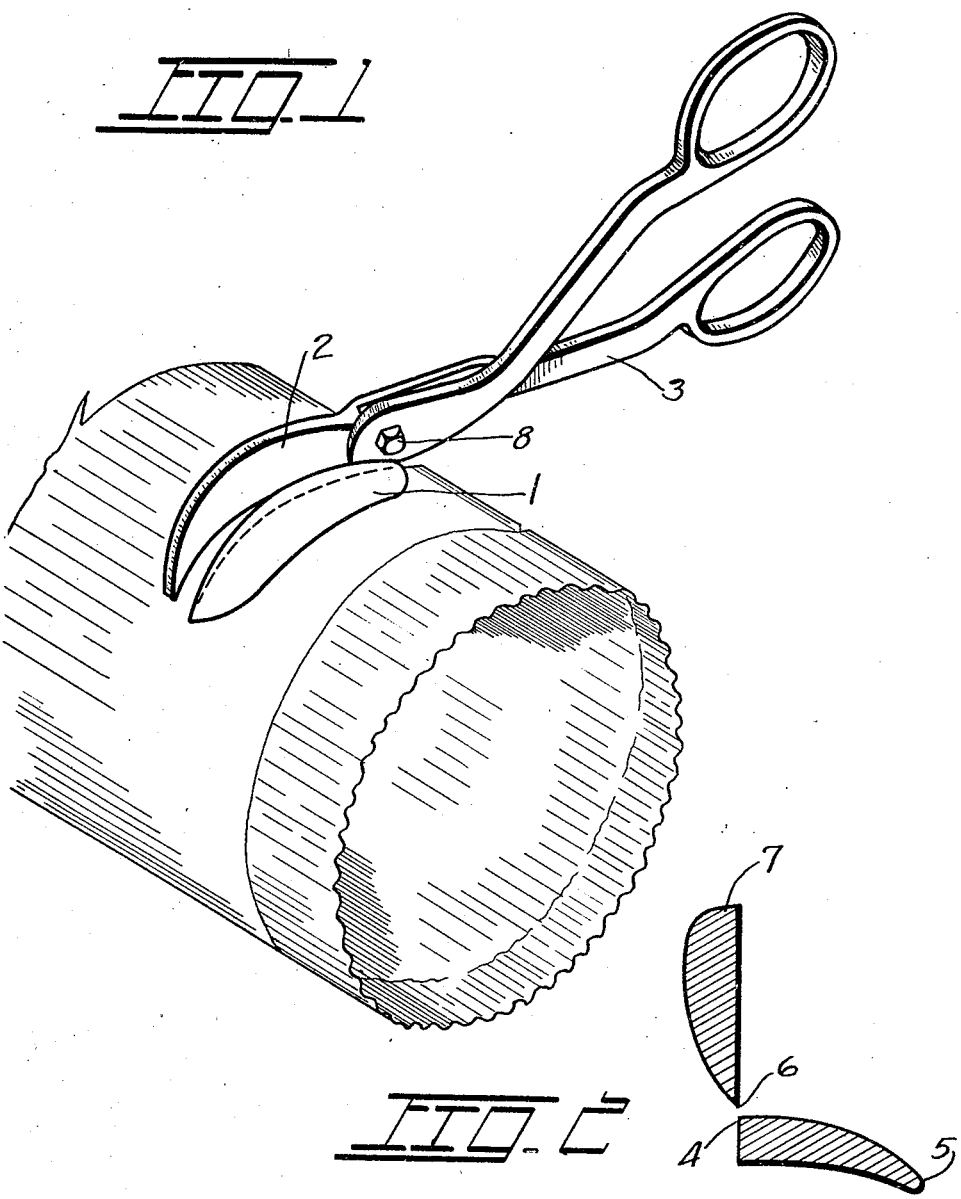
Inventor
Edward J. Richard
By Harry Bowen
Attorney Patented July 28, 1931

1,816,056

UNITED STATES PATENT OFFICE

EDWARD J. RICHARD, OF ABERDEEN, WASHINGTON

CYLINDRICAL CUTTING SHEARS

Application filed July 5, 1928. Serial No. 290,490.

The invention is a pair of shears having a vertical and horizontal blade in combination in which both blades are curved so that they are adaptable for cutting circular objects such as stove pipe.

The object of the invention is to provide a pair of shears that are adaptable for cutting circular objects.

Another object of the invention is to provide a pair of shears having a horizontal shelf at one side.

A further object of the invention is to provide a pair of shears having a combination of vertical and horizontal curved blades.

And a still further object of the invention is to provide a pair of shears for cutting cylindrical objects which is of a simple and economical construction.

With these ends in view the invention embodies a pair of shears having a curved vertical blade cooperating with a curved horizontal blade.

Other features and advantages of the invention will appear from the following description, taken in connection with the drawings, wherein:

Figure 1 is a view showing the device as it would appear in use.

Figure 2 is a cross-section through the blades of the device.

In the drawings the device is shown as it would be made wherein numeral 1 indicates the horizontal blade, numeral 2 the vertical blade and numeral 3 the handles.

The horizontal blade 1 is made as shown with a straight cutting edge as indicated by the numeral 4 and the outstanding portion tapering to a point 5 as shown in Figure 2. This blade tapers and curves outward and downward so that the cutting is done at the heavy portion and the outstanding portion will act as a shelf to support the material. The vertical blade 2 tapers from a sharp cutting edge 6 outward and upward to form a heavy back as indicated by the numeral 7. This combination will form strong and durable cutting edges and will make it possible to readily cut cylindrical shaped material without forcing the material out of shape. The handle 3 may be pivotally connected as shown at the point 8 and may be of any suitable shape or design.

It will be understood that changes may be made in the construction without departing from the spirit of the invention. One of which changes may be in the exact curvature of the blades, another may be in the use of the blades with handles of a different design, and still another may be in the use of other means for pivotally holding the blades together.

The construction will be readily understood from the foregoing description. To use the device it may be provided as shown and it will be observed that by inserting the shears in a cylindrical object, the object may be cut as efficiently as a straight object with straight shears.

It is further understood that although the shears are shown and described with curved blades, the blades may be made straight instead of curved as the invention is in the providing of shears having a vertical blade in combination with a horizontal blade or a pair of shears of any design having an outward extending shelf on one of the cutting blades. This shelf or horizontal blade is a step in advance in the art and may be used on shears of any type.

Having thus fully described the invention, what I claim as new and desire to secure by Letters Patent, is:

In a pair of shears, pivotally connected handles, blades integral with the handles offset with respect to the line of the handles on the opposite side of the pivotal connection, the blades being wider than they are thick, one blade having its greater width in a plane substantially parallel with the pivot, and the other having its greater width perpendicular thereto, the parallel blade being curved transversely and longitudinally away from the pivotal connection and the perpendicular blade being curved longitudinally in the direction of the longitudinal curvature of the parallel blade.

In testimony whereof I affix my signature.

EDWARD J. RICHARD.